US009939231B2

(12) United States Patent
Roncone et al.

(10) Patent No.: US 9,939,231 B2
(45) Date of Patent: Apr. 10, 2018

(54) DUAL-BAND SEMI-ACTIVE LASER SYSTEM

(71) Applicant: RAYTHEON COMPANY, Waltham, MA (US)

(72) Inventors: Ronald L. Roncone, Vail, AZ (US); Raymond S. Lickson, Tucson, AZ (US); Eric X. Peterson, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 90 days.

(21) Appl. No.: 15/001,833

(22) Filed: Jan. 20, 2016

(65) Prior Publication Data
US 2017/0205198 A1 Jul. 20, 2017

(51) Int. Cl.
*G01J 5/02* (2006.01)
*F41G 7/22* (2006.01)
*G01S 3/782* (2006.01)
*G02B 5/02* (2006.01)
(Continued)

(52) U.S. Cl.
CPC ........... *F41G 7/226* (2013.01); *F41G 7/2293* (2013.01); *G01S 3/782* (2013.01); *G02B 5/0278* (2013.01); *G02B 5/285* (2013.01); *G02B 13/18* (2013.01)

(58) Field of Classification Search
CPC ...... F41G 7/226; F41G 7/2293; F41G 7/2246; F42B 15/01
See application file for complete search history.

(56) References Cited

U.S. PATENT DOCUMENTS

| 3,971,939 A | 7/1976 | Andressen |
| 2010/0180428 A1 | 7/2010 | Jones et al. |
| 2010/0264253 A1 | 10/2010 | Taylor et al. |

(Continued)

FOREIGN PATENT DOCUMENTS

WO 9741460 A2 11/1997

OTHER PUBLICATIONS

"Power, Pulse Width, and Repetition Rate Agile Low-cost Multi-spectral Semi-active Laser Simulator", Public Release Affairs Case #96ABW-2010-0160-SAL, pp. 1-9 to O'Daniel et al. (hereinafter "O'Daniel"), available at: https://www.researchgate.net/publication/253482081.*

(Continued)

*Primary Examiner* — Kenneth J Malkowski
(74) *Attorney, Agent, or Firm* — Lando & Anastasi, LLP

(57) ABSTRACT

A dual-band semi-active laser (SAL) sensing system incorporating a dual-passband filter. According to one example, a semi-active laser sensing system includes a detector assembly and an aperture lens. The SAL sensing system further comprises a dual-passband filter having a stopband, a first passband and a second passband, the first and second passbands being distinct and non-overlapping and spectrally separated from one another by a portion of the stopband, the filter being configured to receive the electromagnetic radiation from the aperture lens and to filter the electromagnetic radiation to pass a first wavelength range within the first passband and a second wavelength range within the second passband. The SAL sensing system further includes a lens assembly configured to receive the first and second wavelength ranges from the filter and to focus the first and second wavelength ranges onto the detector assembly.

18 Claims, 8 Drawing Sheets

(51) Int. Cl.
    *G02B 5/28*           (2006.01)
    *G02B 13/18*         (2006.01)

(56) References Cited

U.S. PATENT DOCUMENTS

| | | |
|---|---|---|
| 2011/0089286 A1 | 4/2011 | McCarthy |
| 2012/0105832 A1 | 5/2012 | Streuber |
| 2012/0193538 A1 | 8/2012 | Roncone |
| 2014/0231652 A1 | 8/2014 | Gutierrez |
| 2014/0312161 A1 | 10/2014 | Ell |

OTHER PUBLICATIONS

International Search Report and Written Opinion for application No. PCT/US2016/058802 dated Jun. 16, 2017.

* cited by examiner

DUAL-BAND SEMI-ACTIVE LASER SYSTEM

BACKGROUND

A variety of guidance systems are used in military applications. As one example, semi-active laser (SAL) designation is used in military systems to designate targets and guide a missile or other weapon to the target. In a typical SAL system, the operator of a SAL designator fires a narrow pulsed laser beam at a target. The SAL designator may be man-portable or carried by a designator aircraft such as an unmanned aerial vehicle (UAV).

The laser beam fired by the SAL designator reflects off the target to provide a reflected spot that can be detected by a SAL sensing system. When the designated target is within range, the SAL sensing system processes the detected reflection to detect the spot, acquire the designated target, and verify that the SAL designator was the source. The SAL sensing system includes processing equipment for generating guidance commands from the pulse-stream to guide the weapon to impact.

The SAL system thus provides the ability to precisely guide weapons to a designated target. Furthermore, the SAL system provides a "man-in-the-loop" capability that is preferred in many battlefield situations.

One issue in SAL systems is the wavelength (and thus frequency) of the laser beam used to designate targets. In current implementations, SAL designators have been limited to wavelengths that are not desirable for all applications. For example, typical SAL systems are limited to a single passband, and do not support more than one laser designator wavelength.

Thus, there remains a continuing need for SAL systems in general, and SAL sensing systems in particular that can be adapted to use different electromagnetic radiation wavelengths.

SUMMARY OF THE INVENTION

Aspect and embodiments are directed to semi-active laser (SAL) systems, and in particular, to a SAL system that uses a lens assembly to pass received electromagnetic radiation from a dual-passband filter to a detector, and is configured to operate with at least two different laser designator wavelengths to achieve improved performance. As discussed in more detail below, embodiments of the SAL sensing system can include a dual-passband filter having a structure which allows transmission of more than one distinct laser designator wavelength or range of wavelengths.

The distinct passbands of the filter assembly may be non-overlapping and separated by a stopband, as discussed further below. In one example, the first wavelength range includes a wavelength between approximately 1500 nm and approximately 1600 nm. In some aspects, the first wavelength is 1550 nm. In one example, the second wavelength range includes a wavelength between approximately 1000 nm and approximately 1100 nm. In some aspects, the second wavelength is 1064 nm. The SAL sensing system may further include a microgrid patterned to provide electromagnetic interference (EMI) shielding, as discussed in more detail below.

In some embodiments, a SAL sensing system for a guidance system may comprise a detector assembly, an aperture lens configured to receive electromagnetic radiation, a dual-passband filter having a stopband, a first passband and a second passband, the first and second passbands being distinct and non-overlapping and spectrally separated from one another by a portion of the stopband, the filter being configured to receive the electromagnetic radiation from the aperture lens and to filter the electromagnetic radiation to pass a first wavelength range within the first passband and a second wavelength range within the second passband, and a lens assembly configured to receive the first and second wavelength ranges from the filter and to focus the first and second wavelength ranges onto the detector assembly.

In some aspects, the SAL sensing system further comprises an electromagnetic interference (EMI) shield that is at least 90% transmissive to the first and second wavelength ranges. In some aspects, the EMI shield includes a microgrid pattern disposed on at least one of the filter and the aperture lens. In some aspects, the microgrid pattern is photolithographically deposited. In some aspects, the microgrid pattern is randomized. In some aspects, the microgrid pattern has a linewidth in a range of about 5 μm to about 6 μm. In some aspects, the microgrid pattern is made of gold.

In some aspects, the first passband is centered at approximately 1064 nm and the second passband is centered at approximately 1550 nm. In some aspects, the stopband extends from approximately 700 nm to a lower limit of the first passband, between the first and second passbands, and from an upper limit of the second passband to approximately 1900 nm.

In some aspects, the lens assembly includes at least two lenses, each made from a material selected from the group consisting of glass, zinc sulfide, borosilicate, and polyetherimide. In some aspects, at least one of the two lenses has an aspheric surface figure.

In some aspects, the detector assembly includes a quad-cell sensor having a spectral response that includes a first and second wavelength range.

In some aspects, the SAL sensing system further comprises a diffuser positioned between the filter and the lens assembly.

In some embodiments, a SAL sensing system for a guidance system comprises a detector assembly including a photo-sensitive sensor having a detection band including a first wavelength range; an aperture lens configured to receive electromagnetic radiation; a dual-band filter having a first passband and a second passband, the first and second passbands being distinct and non-overlapping, the dual-band filter being configured to receive the electromagnetic radiation from the aperture lens and to filter the electromagnetic radiation to pass a second wavelength range within the first passband and a third wavelength range within the second passband, and to block from reaching the detector assembly the electromagnetic radiation that is within the detection band and outside the first and second passbands; an electromagnetic interference (EMI) shield transmissive to the first and second wavelength ranges, the EMI shield being disposed on at least one of the aperture lens and the dual-band filter; and a lens assembly configured to receive the first and second wavelength ranges from the filter and to focus the first and second wavelength ranges onto the detector assembly.

In some aspects, the EMI shield includes a microgrid pattern. In some aspects, the microgrid pattern has a linewidth in a range of about 5 μm to about 6 μm. In some aspects, the microgrid pattern is made of gold.

In some aspects, the first passband is centered at approximately 1064 nm and the second passband is centered at approximately 1550 nm.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
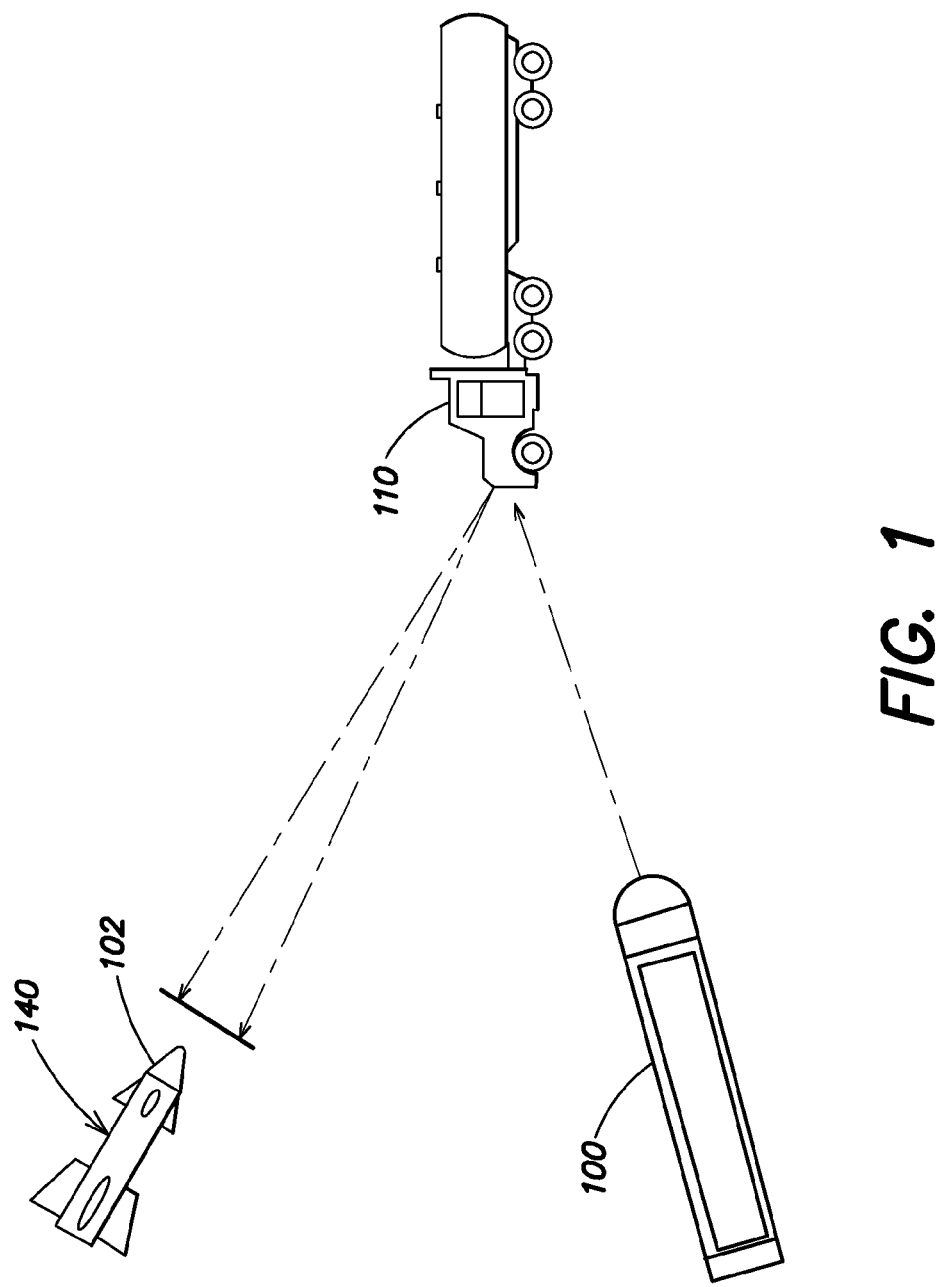
FIG. 1 is schematic view of a semi-active laser (SAL) system used in weapon systems.

As discussed above, conventional SAL systems are typically limited to operation with a single laser designator wavelength. Currently fielded airborne laser designators operate at a wavelength of 1064 nm for tactical usage, and at 1550 nm for range finding and eye-safe non-tactical training exercises. However, current precision guided munitions (PGMs) are limited to being compatible with 1064 nm laser designators. Aspects and embodiments discussed herein allow a warfighter to more effectively use the 1550 nm laser designator by providing a SAL sensor that can operate effectively at either designator wavelength in a tactical environment. Thus, the user will be able to train with the same hardware used in the tactical environment, providing a more accurate and valuable experience for the user, while also reducing logistical requirements associated with such training because the eye-safe wavelength can be used during training. Further, certain embodiments provide a SAL sensor having the same or smaller package size as conventional SAL sensors, allowing for easy retrofit of existing systems with the new SAL sensor.

Aspects and embodiments provide a SAL system having components designed and configured to support the dual-band operation discussed above. In particular, the SAL system includes a lens assembly configured to pass received reflected laser light in either designator waveband from an aperture lens to a detector, a solar filter assembly having dual-band capability, and an electromagnetic interference (EMI) shield. As discussed in more detail below, the solar filter can be a dual-bandpass filter having a pair of distinct, narrow passbands, each centered around one of the laser designator wavelengths of interest (e.g., 1064 nm and 1550 nm), and separated by a stopband. In other examples the solar filter assembly can include one or more switchable filter(s) configured to be switched between two different single passbands. For example, one filter may be used for eye-safe wavebands, and another filter may be used for non-eye-safe wavebands. The filter assembly is thus configured to pass the two (or more) laser designator wavebands of interest, while blocking transmission of essentially all other wavelengths outside the designator wavebands but within the detection band of the detector, as discussed further below.

The lens assembly includes one or more lenses that are constructed and arranged to facilitate the use of the SAL system with different laser designator wavelengths, including eye-safe designators, without needing to change out components. In certain examples the lens assembly is configured for very fast optical speed of up to about f/0.7 to achieve a large sensor field-of-view (FOV) without requiring an excessively large detector. For example, current Indium Gallium Arsenide (InGaAs) technology limits the size of a quad-cell detector to approximately 3-5 mm due to excessive dark current noise due to increased capacitance as the detector active area increases, which in turn can limit the sensor FOV. Certain embodiments can use a detector including an array of pixels to increase the sensor FOV, or fast optics in the lens assembly, as noted above.

The EMI shield is similarly configured to be transparent to both laser designator wavebands of interest. Conventional SAL sensors use a coating of Indium Tin Oxide (ITO) to provide EMI shielding; however, standard ITO is not sufficiently transparent at 1550 nm and therefore cannot provide a viable dual-band solution. As discussed in more detail below, certain embodiments of the SAL system disclosed herein use an optically transparent conductive coating that is highly transmissive at both 1064 nm and 1550 nm. In certain examples, the coating is applied in a microgrid pattern to provide an achromatic, highly transmissive mechanism by which to suppress EMI to at least the same levels as the conventional ITO coating, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

In general, SAL systems are used in military applications where a "man-in-the-loop" capability is preferred to active designation systems that require the weapon to designate the target. Typically, there are two main parts to a SAL system, i.e., a designator used to designate targets and a sensing system used to guide a weapon to the designated target. During use, the operator aims the designator to visualize the target, and typically pulls a trigger to enable the designator and fire a pulse-stream to place a laser "spot" on the target. The SAL sensing system, typically implemented on ordinance weapons such as missiles, receives the reflected returns from the target, and uses the reflected returns to guide the weapon to the target.

Referring to FIG. 1, an exemplary SAL sensing system 102 on a missile 140 tracks a target 110 via a spot of laser light directed at it by laser designator 100. In various SAL systems, the designator 100 may be man-portable or carried by a designator aircraft such as a manned aircraft or an unmanned aerial vehicle (UAV). The operator typically coordinates via radio with a command center and fires the SAL designator 100 to transmit a narrow pulsed laser beam to place and hold a spot on the target. When the missile 140 is in range, the SAL sensing system 102 receives the reflected returns from the target, and processes the returns to detect the spot, acquire the designated target and verify that the SAL designator was the source. The SAL sensing system 102 will typically include processing for initiating the generation of guidance commands from the reflected returns to guide the weapon to impact.

Figure 2:
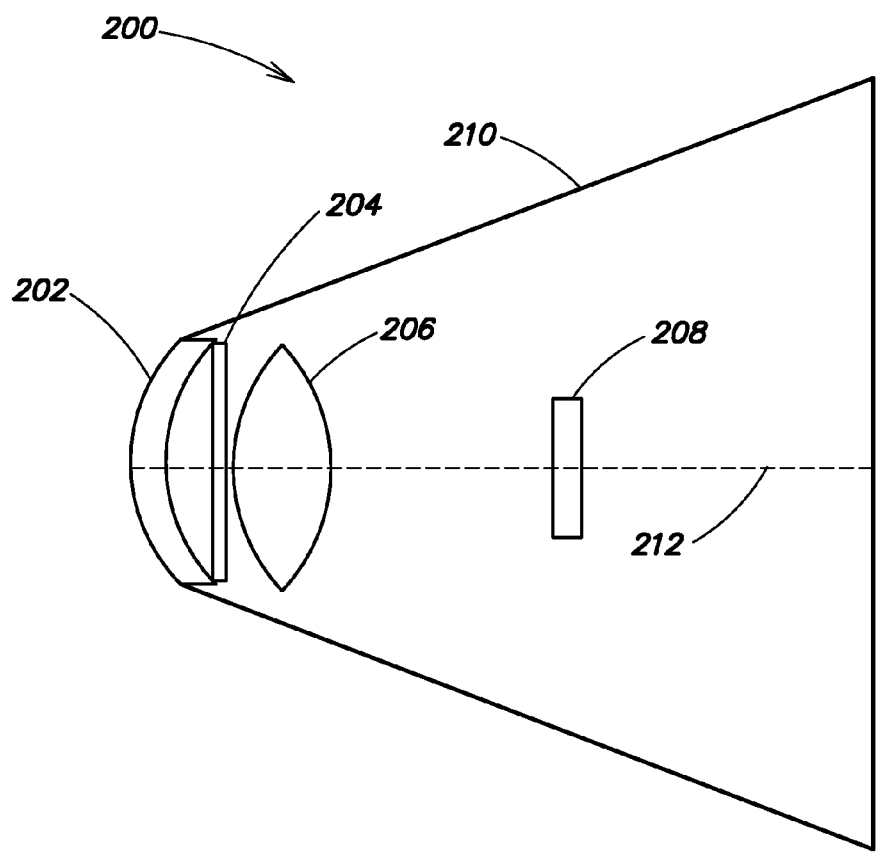
FIG. 2 is a side view of an example of a SAL sensing system in accordance with aspects of the invention.

Turning now to FIG. 2, there is illustrated an exemplary SAL system 200 according to one embodiment. The SAL system 200 includes a housing 210. The housing 210 may house, support, or protect an aperture lens 202, a filter 204, lens assembly 206, and a detector 208. Although the lens assembly is schematically represented in FIG. 2 as a single lens, those skilled in the art will appreciate that the lens assembly can include one or more lenses having a variety of forms and constructed from a variety of materials, depending at least in part on the application or system design and performance objectives, as discussed further below. The aperture lens 202 is configured to receive reflected electromagnetic radiation from the target, and pass the received radiation to the filter 204, which filters the received radiation and passes it to the lens assembly 206. The lens assembly 206 focuses the received radiation to the detector 208. Specifically, the lens assembly 206 redirects incident light received from the filter assembly 204 such that the energy converges on a selected portion of the detector 208. The lens assembly 206 thus ensures that the received light is properly focused on the detector 208, and thus facilitates the detection of reflected laser light.

The aperture lens 202 provides the aerodynamic face of the SAL system 200. Thus, in a typical embodiment, the aperture lens 202 is formed from an appropriate material that is optically clear at the wavelengths of interest. For example, the aperture lens may be made of glass or plastic. In the example illustrated in FIG. 2 the aperture lens has a curved or "dome" shape and may have optical power due to the curvature; however, in other examples the aperture lens may be replaced with a substantially flat window.

The detector 208 detects the presence of the light which has passed through the aperture lens 202, filter 204, and lens assembly 206, and generates a signal which is communicated to a guidance system (not shown). In general, the guidance system receives the signal communicated from the detector 208 and provides signals to the flight control system to control the path of the projectile. As such, the guidance system may include moving components, such as a gimbaled seeker, or may be fixed-post. The guidance system may further comprise any additional elements or components to facilitate implementation, such as a housing, connectors, retaining rings, alignment rings, barrels, pins, adhesives, gaskets, compliant material, spacers, and/or the like.

The detector 208 may be configured in any appropriate manner to detect the relevant energy and generate corresponding signals. In particular, the detector 208 may be configured to produce an output signal in response to incident light. The output signal may vary depending on the position of the incident radiation on the detector 208, and may vary in response to a change in the properties of incident radiation, such as pulse frequency, energy density, wavelength, and total energy. The detector 208 may comprise any appropriate energy detection system, such as a digital imaging system comprising an active pixel sensor, single-pixel light detectors, photocells, charge-coupled devices, and the like. In certain examples the detector 208 is a focal plane array (FPA) sensor that includes a two-dimensional array of light-sensitive pixels. In some examples the detector 208 is sensitive to infrared (IR) radiation and may convert incident IR radiation into electrical signals that may be analyzed by a processor (not shown) to detect and track targets, for example. The detector 208 may be sensitive to IR radiation within a selected portion of the IR spectrum. In some examples, the detector 208 may be disposed within a thermally insulating enclosure, such as a cryo-vac Dewar, for example, such that the detector may be cooled below ambient temperature to reduce thermal noise; however, in other examples, the detector 208 may be uncooled.

Signals generated by the detector 208 may be analyzed to determine the direction from which light is received, such as to guide the projectile to a target. For example, the detector 208 may generate signals corresponding to the amount of energy striking different parts of the detector 208. In particular, in certain examples the detector 208 may convert incident light into electrical signals indicative of an angular bearing to a designated target. For example, detector 208 may be a quad-cell detector that provides four electrical signals indicative of the amount of light incident on each of four quadrants of the detector. The bearing to the designated target may then be determined from the relative strength of each of the four signals.

According to one embodiment, the detector 208 includes a semiconductor substrate on which at least one photodetector is formed. As discussed above, in some examples the detector 208 may be a quad-cell detector, and may therefore include four photodetectors configured to detect laser radiation incident on four respective quadrants of the semiconductor substrate. Four electrodes may be formed on a first side of the semiconductor substrate to make electrical contact to respective photodetector devices, and a single electrode may be formed on a second side of the semiconductor substrate to make a common electrical contact to the photodetector devices. The photodetector devices may be junction photodiodes, pin photodiodes, avalanche photodiodes, or other photodetector devices.

Figure 3A:
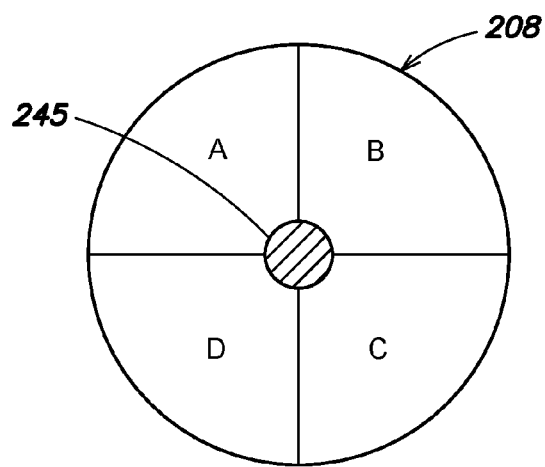
FIG. 3A is a schematic diagram of one example of a quad-cell SAL detector.

FIG. 3A illustrates schematically a frontal view of one example of a quad-cell detector 208 and a focused laser energy spot 245 incident thereon. As discussed above, the detector may comprise four quadrants A, B, C, and D. Each quadrant may produce a corresponding signal A, B, C, and D in response to the energy incident upon each quadrant. Guidance signal ΔX may indicate an imbalance between the energy incident upon the left (quadrants A and D) and right (quadrants C and B) halves of the detector 208. Guidance signal ΔY may indicate an imbalance between the energy incident upon the top (quadrants A and B) and bottom (quadrants C and D) halves of the detector 208. The terms "left," "right," "top," and "bottom" refer to the detector 208 as shown in FIG. 3A and do not imply any physical orientation of the detector 208 within a projectile such as the projectile 100. When the laser spot 245 is centered on the detector 208, the signals A, B, C, and D may be essentially equal and the guidance signals ΔX and ΔY may both be zero or nearly zero. The detector 208 may be a single quadrant or monolithic design that is positionally sensitive.

Figure 3B:
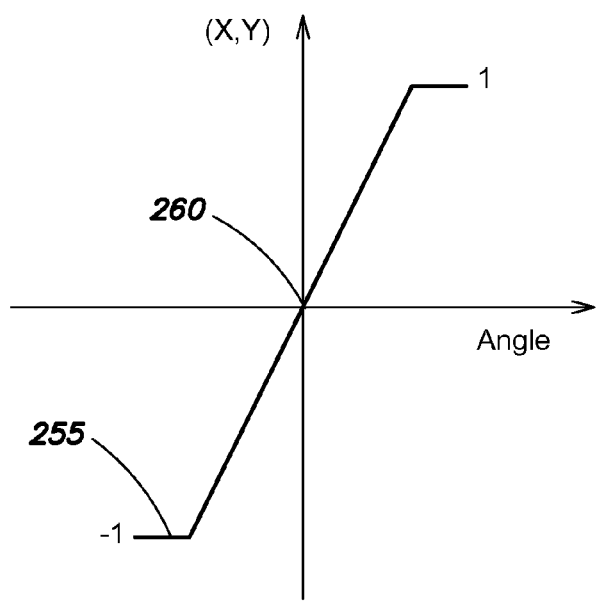
FIG. 3B is a graph of the ideal transfer function of the SAL detector of 3A for a field of view about boresight.

In one example, the detector 208 may effectively measure the centroid of the incident energy on the detector 208. As shown in FIG. 3B, the transfer function 255 is a ratio of the energy on the different quadrants of the detector 208. When energy in spot 245 is hitting all four quadrants A-D, the guidance system operates in a "linear" region 260 of the transfer function 255, referred to herein as the linear field of view of the SAL seeker. Given ΔX and ΔY, the transfer function 255 in the linear region 260 determines the angle of the guidance system from the target (e.g., target bearing). When energy is hitting only two quadrants, the guidance system operates outside the linear region, where the transfer function nears ±1 for ΔX or ΔY. In this circumstance, the guidance system only knows the direction towards the target, but not its true angle. The size of the spot 245 may affect the performance of the guidance system. For example, a small spot tends to move off of overlapping multiple detector areas faster than a big spot. A larger spot improves the transfer function by making a relatively wide transfer function thereby covering larger angles of boresight.

Referring again to FIG. 2, in one embodiment, the detector 208 is configured to detect radiation in multiple distinct wavebands. For example, the detector 208 may be configured to detect radiation at wavelengths now commonly used in SAL systems and another wavelength. In one particular embodiment, the detector 208 comprises a dual band detector configured to detect radiation at two distinct wavelengths. In this embodiment, the detector 208 may be configured to detect wavelengths between 1000 nm and 1100 nm, allowing the device to detect targets that are designated with current devices. Likewise, the detector may be also configured to detect wavelengths between 1500 nm and 1600 nm, allowing the SAL system 200 to be used to detect radiation with wavelengths that are eye safe and less likely to be detectable with readily available inexpensive sensors. In other examples the detector may be configured to detect wavelengths of light spanning a range, such as approximately 900-1700 nm, for example, that encompasses the wavelengths of laser designators anticipated to be used with the SAL system 200. In this case, the filter 204 can be used to block all or most wavelengths within the range (detection band) other than the laser designator wavelengths, as discussed further below. In one example the detector 208 includes an InGaAs quad-cell sensor having a spectral response from about 900 nm to about 1700 nm. Such quad-cell sensors currently are limited by noise constraints to about 3-5 mm in size; however, the lens assembly 206 can be configured to provide an adequate field-of-view for the detector 208.

As stated above, in a typical implementation a guidance system receives the signals from the detector 208 and guides the missile or other projectile to the source of received light. As such, the guidance system may comprise any controller for receiving information from the detector 208 and guiding the projectile according to the detector information. As the detector 208 communicates information to the guidance system, the system analyzes the information and, if necessary, transmits guidance information to the control surfaces, propulsion system, or other guidance elements.

Still referring to FIG. 2, the filter 204 serves to filter received electromagnetic radiation based on wavelength. This helps to ensure that certain wavelengths of electromagnetic radiation are transmitted to the detector 208, and other wavelengths are blocked. As discussed above, current SAL sensing systems generally have a single passband. For example, some current SAL sensing systems have an approximately 50 nm bandpass around 1064 nm, and block energy from about 400 nm to about 1200 nm. In contrast, to support both a standard tactical laser designator at 1064 nm and an eye-safe laser designator at 1550 nm or another eye-safe wavelength, the filter 204 must be highly transmissive to electromagnetic energy at these wavelengths, but also preferably block electromagnetic energy outside of these wavelengths over the detection band of the detector 208, for example, covering a range from about 900 nm to about 1700 nm, as discussed above.

Figure 4:
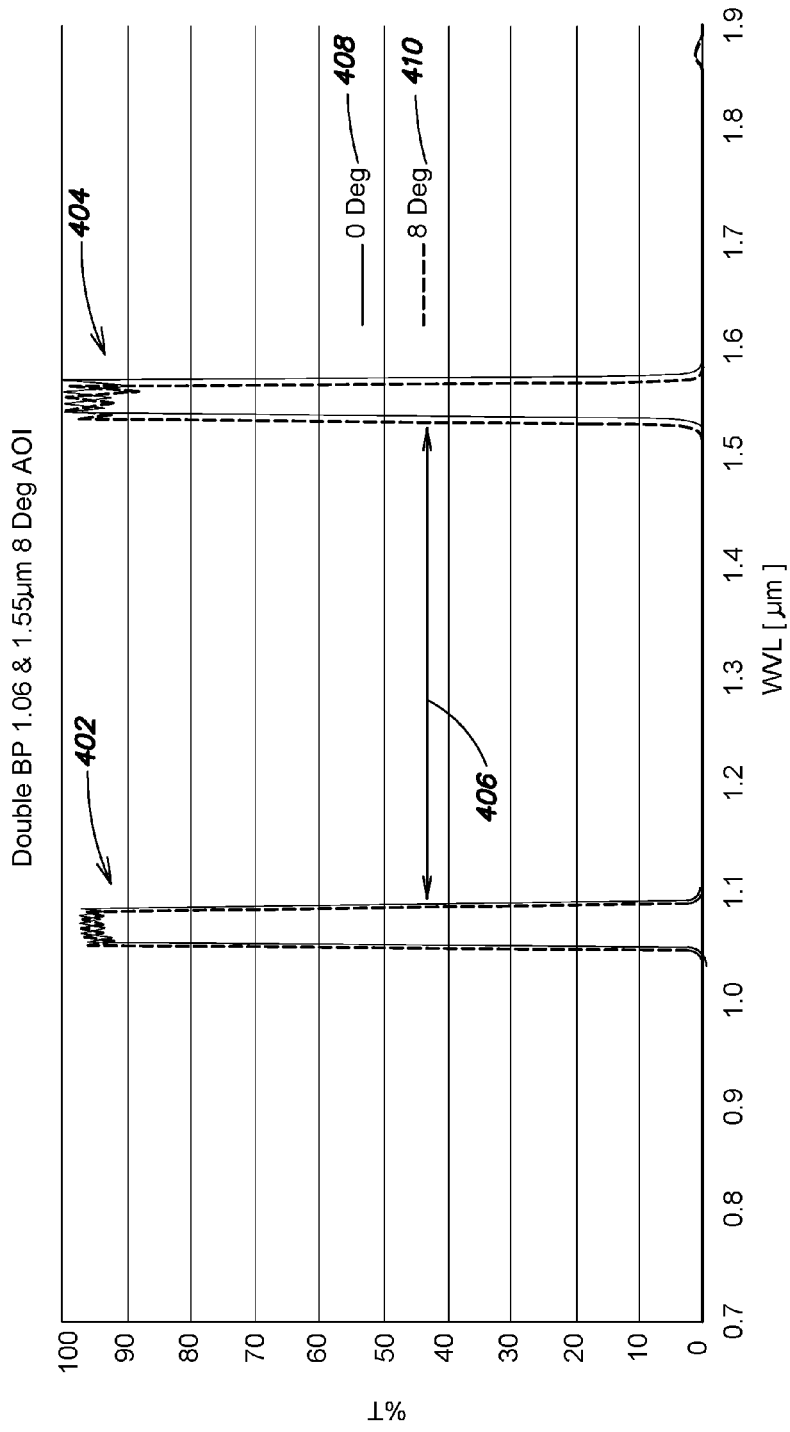
FIG. 4 is a graph showing dual-passband transmission in accordance with an embodiment of the invention.

FIG. 4 is a graph illustrating the transmission characteristic of one example of a double (dual) passband filter that can be used as the filter 204 according to certain embodiments. As shown, in this example the filter has two distinct passbands, namely a first passband 402 at about 1064 nm and a second passband 404 at about 1550 nm, separated by a stopband 406. Trace 408 illustrates the transmission characteristic for a 0° angle of incidence of incoming light, and trace 410 illustrates the transmission characteristic for an 8° angle of incidence of the incoming light. As shown, the two passbands 402, 404 are steep and narrow, each being approximately 35 nm wide. With each of the two passbands 402, 404, the filter has very high transmission, generally above 90%, and is highly blocking to all wavelengths outside of the two passbands over a spectral range from 700 nm to 1900 nm. In some embodiments, the filters may be configured to allow for an angle of incidence of up to about 24°, which may result in the passbands having an increased width of about 50 nm to about 55 nm around each of the desired center wavelengths.

A filter having the transmission characteristic shown in FIG. 4, or a similar transmission characteristic, can be implemented using a stack of thin films or coatings on the face of a filter substrate. The stack can include in excess of 50 coating layers. By adjusting the number of layers in the stack and the thickness of each layer, the passband can be controlled. The layers can be deposited using traditional evaporation methods, or various forms of sputtering for example, to achieve very thin uniform layers of alternating high and low index fraction materials onto the filter substrate. The thin layers create interference effects used to enhance transmission or reflection properties within the system. While the wavelength of light and angle of incidence are usually specified, the index of refraction and thickness of layers can be varied to optimize performance. Each thin layer may have a thickness of less than about a wavelength of light. For example, each thin layer may have a thickness of about a quarter of a wavelength of light.

As discussed above, in another example the filter 204 can include one or more switchable filters, each having a single passband, rather than a dual-passband filter. A control and actuation mechanism can be included to allow a user to switch a filter into and out of an optical path between the aperture lens 202 and the lens assembly 206 or detector 208 based on the laser designator being used at any given time. Single-band filters may be easier to manufacture; however, including a switchable component can increase power or space requirements and introduce a potential point of failure. Accordingly, a static dual-passband filter may be preferred in some implementations.

Figure 5:
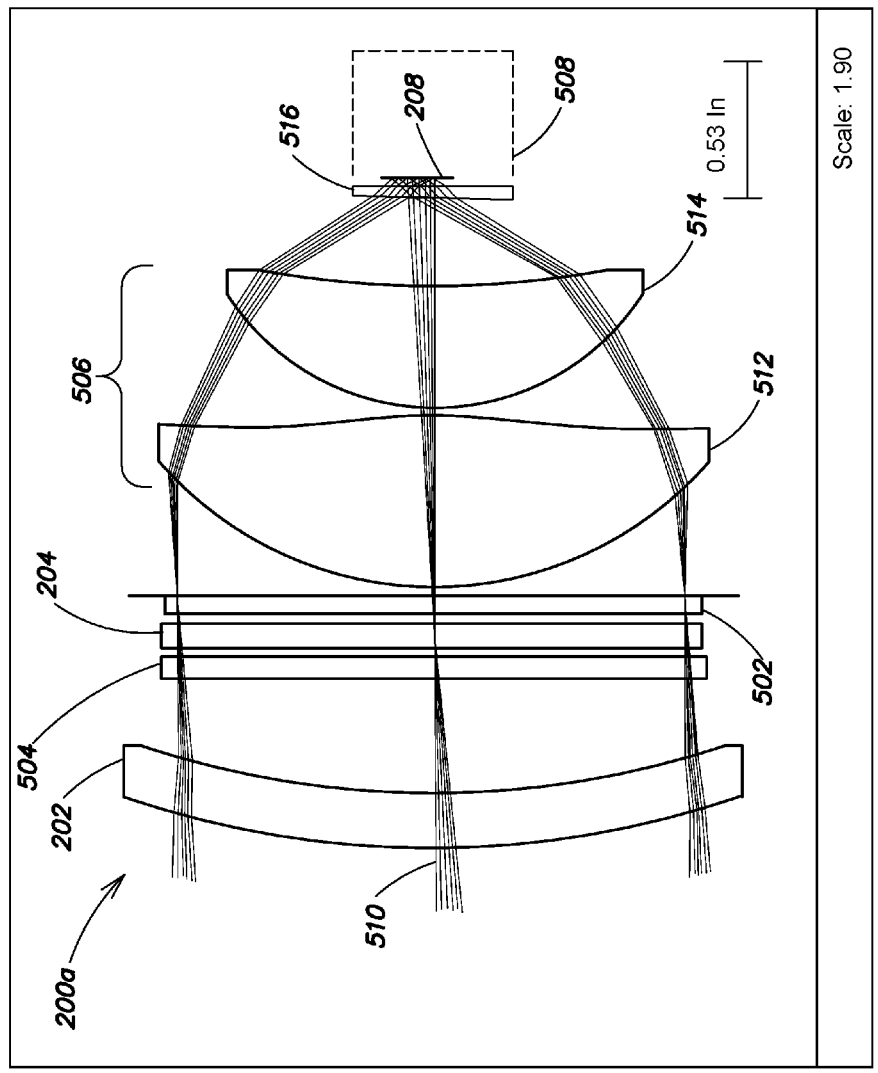
FIG. 5 is a schematic diagram of another example of a SAL sensing system in accordance with aspects of the invention.
Figure 7:
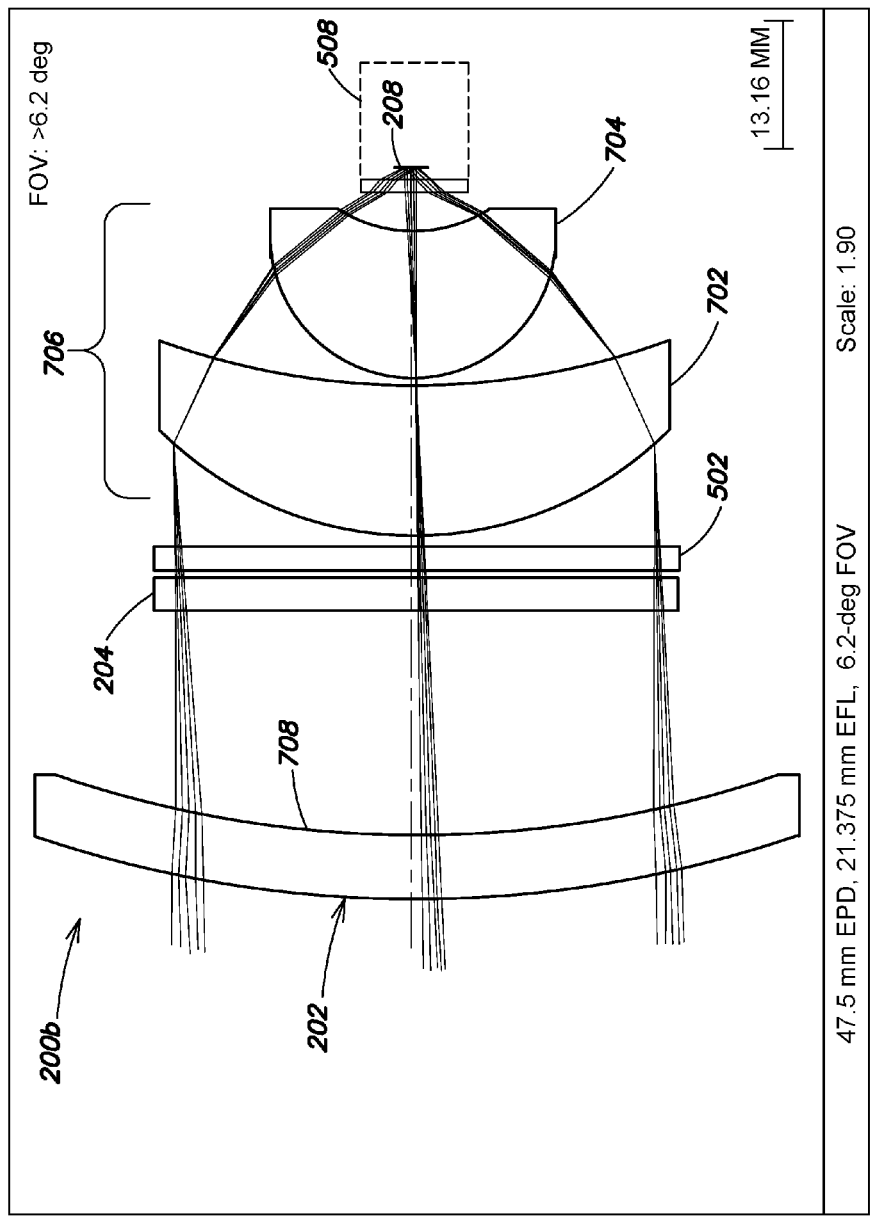
FIG. 7 is a schematic diagram of another example of a SAL sensing system in accordance with aspects of the invention.
Figure 8:
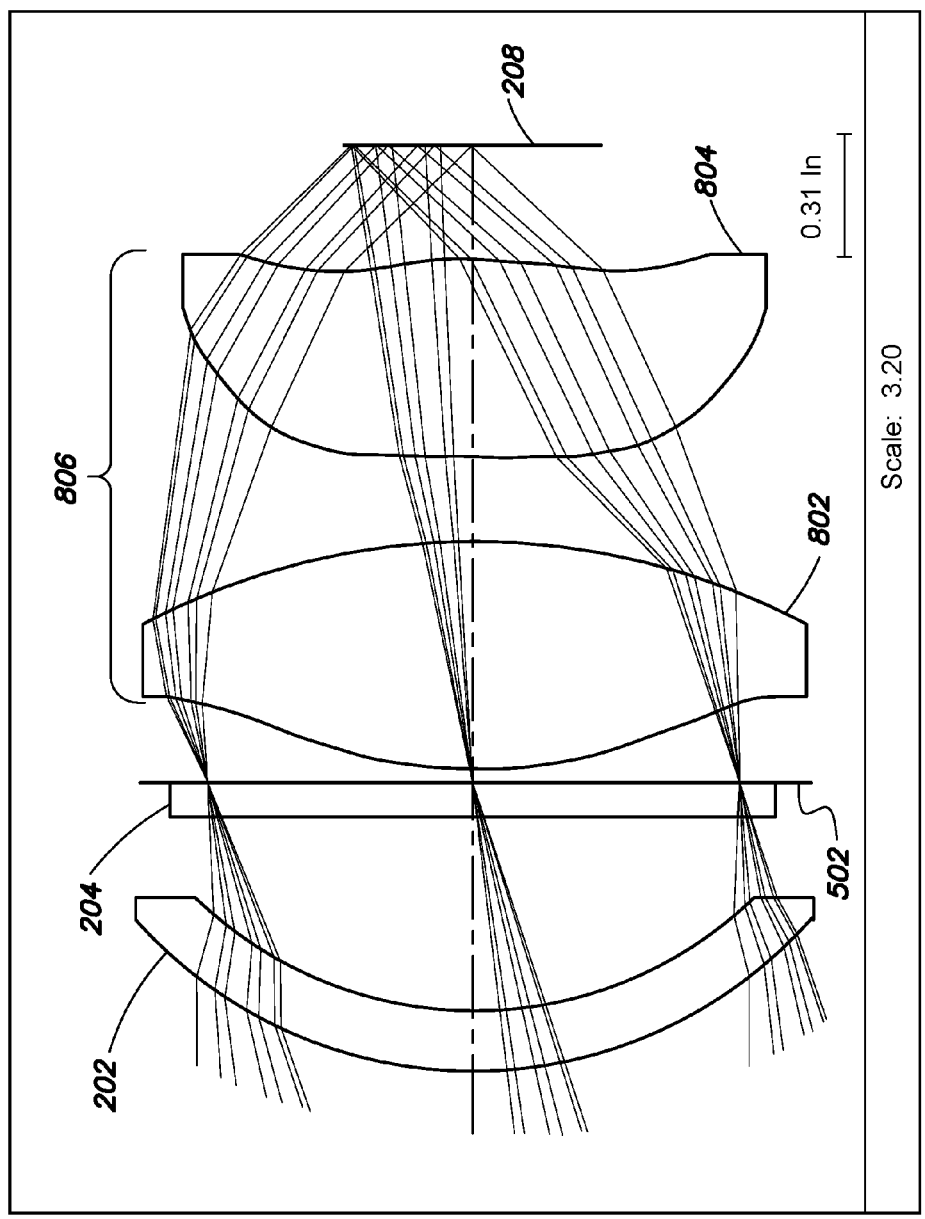
FIG. 8 is a schematic diagram of another example of a SAL sensing system in accordance with aspects of the invention.

The various components included in the SAL system 200 can be arranged in a variety of configurations, and the system can include additional components. For example, in certain embodiments the SAL system 200 includes an EMI shielding grid, as discussed above, which can be provided as an additional component or integrated into any one of the aperture lens 202, the filter 204, or the lens assembly 206. The SAL system can further include a diffuser, optionally positioned between the filter 204 and the lens assembly 206, configured to diffuse the light received via the filter 204 and pass the diffused light to the lens assembly. Furthermore, in the example illustrated in FIG. 2, the filter assembly 204 and the lens assembly 206 are shown as separate elements; however, this is just one example, and these components may instead be integrated into fewer units or even a single unit, for example, to reduce the number of parts and/or the package size of the SAL system 200. For example, the filter 204 can be integrated into a surface of one of the lenses in the lens assembly 206. In such an embodiment, the lens may require an adjusted thickness to provide adequate distance over which to filter transmitted energy. FIGS. 5, 7, and 8 illustrate various examples of configurations of SAL systems in accord with certain embodiments, each of which is discussed further below.

Referring to FIG. 5, one embodiment of a SAL system 200a is illustrated schematically. In this example, the sensing system 200a includes the aperture lens 202, the filter 204, a lens assembly 506, the detector 208, a diffuser 502, a grid 504, and a detector housing 508. The aperture lens 202 is configured to receive reflected electromagnetic radiation 510 from the target, and pass the received radiation through the grid 504 to the filter 204. The aperture lens can be made of glass or plastic, for example. The filter 204 passes the radiation to the diffuser 502, which diffuses the received radiation and passes it to the lens assembly 506. The lens assembly 506 focuses the received radiation onto the detector 208, as discussed above. In one example the electromagnetic radiation 510 includes wavelengths 1064 nm and 1550 nm. The detector is housed within a housing 508, which can provide additional EMI shielding for example. The housing 508 has an optically transparent window 516 to allow the electromagnetic radiation to reach the detector 208. In one example the housing 508 is made of aluminum.

In the illustrated embodiment of FIG. 5, the lens assembly 506 comprises two lenses, namely a first lens 512 and a second lens 514. These two lenses are designed to function together to guide incident radiation from the diffuser 502 to the detector 208. The lenses 512 and 514 can include any materials that are sufficiently optically transparent at least to the wavelength ranges of interest (e.g., corresponding approximately to the passbands of the filter 204), and can have a variety of surface forms, not limited to the particular shapes shown in FIG. 5. In one example the lenses 512 and 514 are each made from a material having substantial optical clarity for radiation having wavelengths between 1000 nm and 1100 nm and between 1500 nm and 1600 nm. In one example the first lens 512 is made from an optical grade plastic. For example, the first lens may be made from polycarbonate, acrylic, polysulfone, or polyester. In some embodiments, the first lens is made from a polyetherimide, such as Ultem. The second lens 514 may be made from an optical glass. For example, the second lens may be made from Schott NSF4.

As discussed above, the grid 504 is provided for EMI suppression. In the example illustrated in FIG. 5, the grid 504 is provided as a planar element positioned in front of the filter 204; however, various other arrangements can be implemented as discussed further below. The grid 504 may comprise a microgrid pattern formed on a substrate or other supporting structure, and which is designed to provide EMI shielding against unwanted electromagnetic radiation while being highly transparent to the wavebands of interest. The grid 504 can be formed of a conductive material, such as a metal, for example. Certain conventional SAL sensing systems include a layer of indium tin oxide (ITO), which is deposited on the aperture lens or conventional filter for example, to provide EMI suppression. However, although ITO transmits well at 1064 nm, it exhibits poor transmission at eye-safe laser designator wavelengths. For example, ITO exhibits only about 40% transmission at a laser designator wavelength of about 1550 nm. Accordingly, to achieve a dual-band SAL in accord with aspects and embodiments disclosed herein, the conventional ITO EMI shield can be replaced with the grid 504 having a pattern that facilitates the use of SAL systems with different laser designator wavelengths to improve the performance of the SAL system. In particular, the grid 504 can be configured to have very high transmission at both the about 1064 nm and one or more eye-safe wavelengths.

For example, the grid 504 can be formed with a pattern and linewidth selected to be transmissive to wavelengths in the ranges of about 1000-1100 nm and 1500-1600 nm. In certain examples compatible with laser designator wavelengths of 1064 nm and 1550 nm, the grid 504 can include a conductive microgrid photolithographically deposited on an optically transparent substrate with linewidths in a range of about 5-6 μm. Such microgrids are effectively achromatic for the above-mentioned wavebands and achieve very high transmission, for example, about 92% to about 94% at these wavelengths. In certain examples, an anti-reflective (AR) coating may be deposited over the microgrid to maximize transmission. The grid 504 can comprise a conductive or magnetic material. In certain examples, the grid 504 can comprise a metal, for example, gold, silver, or aluminum.

Figure 6A:
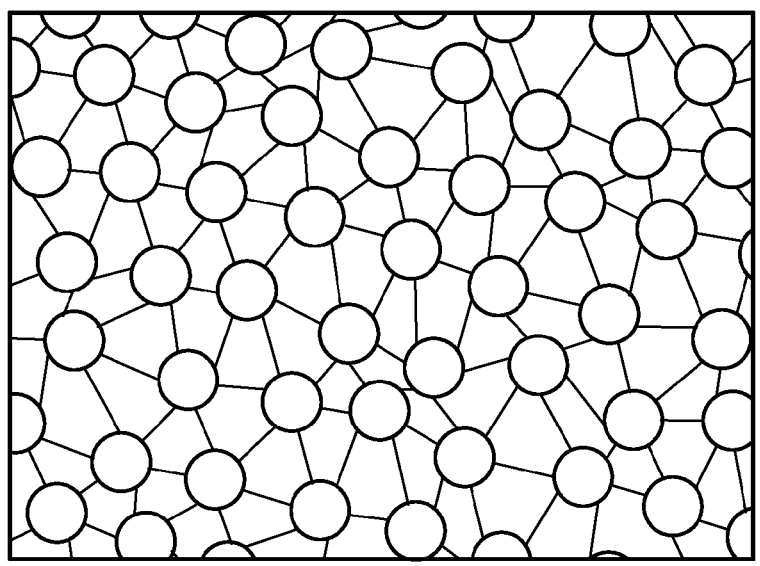
FIG. 6A is a plan views of one example of a microgrid pattern that can be used in a SAL system in accordance with aspects of the invention.
Figure 6B:
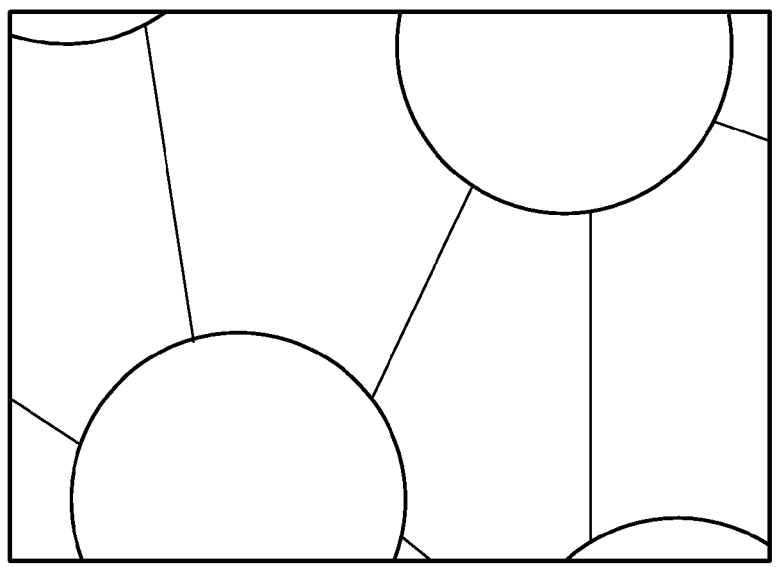
FIG. 6B is an enlarged view of a portion of the microgrid pattern of FIG. 6A.

According to certain embodiments, the grid 504 may have a randomized pattern to reduce diffraction effects. One example of a microgrid 504 having a randomized pattern is illustrated in FIGS. 6A and 6B. As shown in FIGS. 6A and 6B, the grid 504 can include a pattern of straight and curved lines, and is not limited to a traditional rectangular grid of parallel and perpendicular lines. As will be appreciated by those skilled in the art, given the benefit of this disclosure, the grid 504 can have a variety of patterns to achieve the function of suppressing electromagnetic interference (EMI) at certain energy bands, and allowing energy to pass at other energy bands, not limited to the specific examples or patterns disclosed herein. Advantageously, the microgrid may perform as well as or better than a traditional ITO coating for EMI suppression at 1064 nm.

Referring again to FIG. 5, the exemplary SAL system 200a shown provides robust dual-band performance. In one example the focus difference between the two wavelengths 1064 nm and 1550 nm is approximately 0.014 inches. The nominal focus of the optics can be set to approximately the mid-point between these two wavelengths, for example. Including the diffuser 502 allows a larger tolerance for defocus. Although the diffuser may exhibit slightly different characteristics at the two different wavelengths, its function is preserved over the waveband of interest.

In the example illustrated in FIG. 5, the diffuser 502, filter 204, and grid 504 are shown as separate elements; however, as discussed above, a variety of other configurations can be implemented. For example, referring to FIG. 7, there is illustrated another embodiment of a SAL sensing system 200b including the aperture lens 202, filter 204, diffuser 502, a lens assembly 706, and the detector 208. In this embodiment, the grid 504 is not shown as a separate element. Instead, the grid 504 can be patterned onto an inner surface 708 of the aperture lens, or onto either surface of the filter 204. For example, the microgrid pattern may be photolithographically deposited onto a plano substrate of the filter 204 or onto the surface 708 of the aperture lens 202.

FIG. 7 also illustrates another example of the lens assembly 706. In this example the lens assembly 706 includes a first lens 702 and a second lens 704. Each of the lenses 702 and 704 can be formed from a material, for example, a polymer or glass, having substantial optical clarity for electromagnetic radiation in a wavelength range that includes the two laser designator wavelengths of interest, for example, between 1.0 and 2.0 µm. In a more specific implementation, the lenses 702 and 704 are formed from a glass material having substantial optical clarity for electromagnetic radiation at wavelengths between 1000 nm and 1100 nm and between 1500 nm and 1600 nm. In certain examples, at least one of the lenses 702 and 704 may have an aspheric surface figure. Accordingly, it may be preferable to select a material such as Zinc Sulfide, which is readily available and can be diamond-point turned to achieve the aspheric surface figure. Other materials can include common optical glasses and a variety of optical plastics. In one example, the first lens 702 is made of Zinc Sulfide (ZnS) and the second lens is made of Schott BK7 glass.

In other embodiments, the filter 204 can be integrated into another component in the SAL sensing system, and need not be provided as a separate element. For example, referring to FIG. 8, there is illustrated an example in which the filter 204 and diffuser 502 are integrated into a single component. Further, the grid 504 can be integrated with the filter/diffuser combination, or provided on the surface of the aperture lens 202 as discussed above. FIG. 8 also illustrates another configuration of a lens assembly 806. In this example, the lens assembly 806 includes a first lens 802 and a second lens 804, both made from Ultem.

Thus, aspects and embodiments provide a dual-band SAL sensing system that includes a filter, EMI grid or shield, lens assembly, and optionally a diffuser, configured to pass selected wavebands of received reflected laser light from an aperture to a detector so as to enable compatibility with both standard tactical laser designators (e.g., at 1064 nm) and eye-safe laser designators. As discussed above, certain embodiments of the SAL sensing system include a dual-band filter that has two distinct passbands corresponding to a first wavelength range and a second wavelength range. The first and second wavelength ranges may be spectrally separated and non-overlapping. Accordingly, the dual-band filter facilitates compatibility with laser designators using multiple narrow wavebands, instead of the single waveband associated with typical SAL sensing systems. In certain examples the dual-band filter may have passbands around 1064 nm and around 1550 nm, the passbands having a spectral width of about 20-50 nm, dependent upon the angles of incidence of the light energy impinging on the filter. The dual-band filter may block energy (i.e., has a stopband) outside of these bands from about 900 nm to about 1700 nm. In contrast, typical SAL filters only have a 20-50 nm passband around 1064 nm, and have a stopband outside of the passband from about 400 nm to about 1200 nm, which covers the spectral response of the Silicon sensors. The EMI shield is further compatible with both laser designator wavebands noted above. For example, as discussed above, the EMI shield can include a randomized microgrid pattern that can be included as an additional component or may be deposited on at least one of the filter and the aperture lens.

Having described above various features and aspects of at least one embodiment, it will be appreciated that various alterations, modifications, and improvements will readily occur to those skilled in the art. Such alterations, modifications, and improvements are intended to be part of this disclosure and are intended to be within the scope of the invention. Those skilled in the art will appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. It is therefore to be understood that the embodiments described herein are presented by way of example only and that, within the scope of the appended claims and equivalents thereto; the disclosed embodiments may be practiced otherwise than as specifically described. Accordingly the foregoing description and figures are by way of example only, and the scope of the invention should be determined from proper construction of the appended claims, and their equivalents.

What is claimed is:

1. A semi-active laser (SAL) sensing system for a guidance system, the SAL sensing system comprising:
   a detector assembly;
   an aperture lens configured to receive electromagnetic radiation;
   a dual-passband filter having a stopband, a first passband, and a second passband, the first and second passbands being distinct and non-overlapping and spectrally separated from one another by a portion of the stopband, the filter being configured to receive the electromagnetic radiation from the aperture lens and to filter the electromagnetic radiation to pass a first wavelength range within the first passband and a second wavelength range within the second passband;
   an electromagnetic interference (EMI) shield including a microgrid pattern formed from a conductive material and disposed on the filter, the EMI shield being transmissive to the first and second wavelength ranges and being configured to suppress incident electromagnetic interference;
   a diffuser integrated with the filter and the EMI shield, the diffuser configured to diffuse the first and second wavelength ranges; and
   a lens assembly configured to receive the first and second wavelength ranges from the filter and to focus the first and second wavelength ranges onto the detector assembly.

2. The SAL sensing system of claim 1 wherein the EMI shield is at least 90% transmissive to the first and second wavelength ranges.

3. The SAL sensing system of claim 2 wherein the microgrid pattern is photolithographically deposited.

4. The SAL sensing system of claim 2 wherein the microgrid pattern is randomized.

5. The SAL sensing system of claim 2 wherein the microgrid pattern has a linewidth in a range of about 5 µm to about 6 µm.

6. The SAL sensing system of claim 2 wherein the conductive material is gold.

7. The SAL sensing system of claim 1 wherein the first passband is centered at approximately 1064 nm and the second passband is centered at approximately 1550 nm.

8. The SAL sensing system of claim 7 wherein the stopband extends from approximately 700 nm to a lower limit of the first passband, between the first and second passbands, and from an upper limit of the second passband to approximately 1900 nm.

9. The SAL sensing system of claim 1 wherein the lens assembly includes at least two lenses, each made from a material selected from the group consisting of glass, zinc sulfide, borosilicate, and polyetherimide.

10. The SAL sensing system of claim 9 wherein at least one of the two lenses has an aspheric surface figure.

11. The SAL sensing system of claim 1 wherein the detector assembly includes a quad-cell sensor having a spectral response that includes the first and second wavelength ranges.

12. The SAL sensing system of claim 1 wherein the diffuser is positioned between the filter and the lens assembly.

13. The SAL sensing system of claim 12 further comprising an anti-reflective coating deposited over the microgrid pattern disposed on the filter.

14. A semi-active laser (SAL) sensing system for a guidance system, the SAL sensing system comprising:
   a detector assembly including a photo-sensitive sensor having a detection band including a first wavelength range;
   an aperture lens configured to receive electromagnetic radiation;
   a dual-band filter having a first passband and a second passband, the first and second passbands being distinct and non-overlapping, the dual-band filter being configured to receive the electromagnetic radiation from the aperture lens and to filter the electromagnetic radiation to pass a second wavelength range within the first passband and a third wavelength range within the second passband, and to block from reaching the detector assembly the electromagnetic radiation that is within the detection band and outside the first and second passbands;
   an electromagnetic interference (EMI) shield transmissive to the second and third wavelength ranges, the EMI shield including a microgrid pattern formed from a conductive material and disposed on the dual-band filter, the EMI shield being configured to suppress incident electromagnetic interference;
   a diffuser integrated with the dual-passband filter and the EMI shield, the diffuser configured to diffuse the second and third wavelength ranges; and
   a lens assembly configured to receive the second and third wavelength ranges from the filter and to focus the second and third wavelength ranges onto the detector assembly.

15. The SAL sensing system of claim 14 wherein the microgrid pattern has a linewidth in a range of about 5 µm to about 6 µm.

16. The SAL sensing system of claim 15 wherein the conductive material is gold.

17. The SAL sensing system of claim 14 wherein the first passband is centered at approximately 1064 nm and the second passband is centered at approximately 1550 nm.

18. The SAL sensing system of claim 14 further comprising an anti-reflective coating deposited over the microgrid pattern disposed on the filter.

* * * * *